US005783005A

United States Patent [19]

Handler

[11] Patent Number: 5,783,005

[45] Date of Patent: Jul. 21, 1998

[54] METHOD FOR PRESENTING A PICTURE

[75] Inventor: Milton E. Handler, Northbrook, Ill.

[73] Assignee: M&R Pictures, U.S.A., Inc., Fox Lake, Ill.

[21] Appl. No.: 650,603

[22] Filed: May 20, 1996

[51] Int. Cl.$^6$ .......... B32B 31/00

[52] U.S. Cl. .......... 156/63; 156/58; 156/59; 156/264; 40/700; 40/743; 40/760; 40/768; 40/773; 40/798; 40/800; 428/14

[58] Field of Search .......... 428/14; 156/58, 156/59, 63, 264; 40/800, 743, 798, 760, 768, 773, 700

[56] References Cited

U.S. PATENT DOCUMENTS

| | | | |
|---|---|---|---|
| 1,153,424 | 9/1915 | Doolittle et al. . | |
| 1,427,874 | 9/1922 | Weaver | 40/768 |
| 1,628,640 | 5/1927 | Baldwin | 40/798 |
| 3,447,274 | 6/1969 | Davidson | 428/14 X |
| 3,868,283 | 2/1975 | Scheyer . | |
| 4,161,831 | 7/1979 | Restle . | |
| 4,283,871 | 8/1981 | Applebaum et al. | 40/768 |
| 4,897,943 | 2/1990 | Otake | 40/768 |
| 5,404,663 | 4/1995 | Schober | 40/768 |
| 5,470,410 | 11/1995 | Keating et al. . | |

FOREIGN PATENT DOCUMENTS 2116122 9/1983 United Kingdom .

*Primary Examiner*—Jeff H. Aftergut
*Attorney, Agent, or Firm*—John W. Harbst

[57] ABSTRACT

A method is provided for producing a composite work from a single two-dimensional work having an image thereon. A flat backing member is provided having generally the same shape and size as the two-dimensional work. The work and the backing member are bonded together to form a work piece. The work piece is cut to define a geometrically shaped center section and a separate perimeter section, thereby breaking the image of the two-dimensional work regardless of individual sculptural components of the work so that each of the sections displays the respective portion of the broken image. The center section and border section are then assembled such that the continuity of the image formed by the sections is broken.

15 Claims, 4 Drawing Sheets

METHOD FOR PRESENTING A PICTURE

FIELD OF THE INVENTION

The present invention relates generally to a method and apparatus for presenting a picture, and more particularly, to a method for producing a composite work having unique spacing between components of the picture to create a broken yet congruous image.

BACKGROUND OF THE INVENTION

It is well known to provide a mat around the periphery of a picture to enhance the visual impact of the picture itself. Often, the color of the mat is chosen to match or complement certain features in the picture, and the pattern is plain so as not to detract a viewer's attention from the picture. Typically, the mat is configured as an intermediate border between the picture and a decorative frame.

A variety of efforts have also been undertaken to represent two-dimensional images in three-dimensions. One such prior art method creates the three dimensional effect by arranging three-dimensional shapes on a sheet over pre-drawn outlines for each shape, then rolling or placing on the positioned shapes a background.

Another such method does just the opposite by cutting the subject away from its background. Specifically, the subject is first cut from the background, and then slits are made in the subject to facilitate the bending of contours, thereby forming a three-dimensional work.

Yet another approach is to use multiple copies of the two-dimensional work to create the desired three-dimensional effect. The desired portions of the work are cut from the multiple copies and layered to form the three-dimensional representation. In addition, attempts have been made to create the three-dimensional effect by making diverging borders of the picture frame part of the picture or foreground.

A more recent approach to creating such a three-dimensional image is to bond a single copy of the two-dimensional work to a stiff backer forming a composite. The composite is cut into a plurality of pieces using a sculpture station. The pieces are then reattached to each other by spacers forming more than one layer.

One common element of these prior art attempts to create a three-dimensional image is that the individual shapes or subjects of the picture are cut out or separated from the background. It is therefore desirable to provide a composite work wherein the individual images may actually be broken so that each section of the two-dimensional work displays the respective portion of the same image on a different layer. It is also desirable to provide a convenient and efficient method of making a spaced apart composite work without taking the time and expense to carve out individual features of the picture.

SUMMARY OF THE INVENTION

In view of the above, and in accordance with the present invention, there is provided a method for producing a composite work from a single two-dimensional work such as a print, poster, drawing, painting or photograph. A flat backing member is provided having generally the same shape and size as the two-dimensional work. The two-dimensional work and the backing member are bonded together by adhesive or other suitable means to form a work piece. The work piece is then cut to define a geometrically shaped center section and a separate perimeter section, thereby breaking the image of the two-dimensional work so that each of the sections displays the respective portion of the broken image. The center section and border section are then assembled such that the continuity of the image formed by the sections is broken.

In a preferred form of the invention, an intermediate border or mat is interposed between the perimeter section and center section of the work piece. The intermediate border also has a central opening, but is defined by inner edges which extend inwardly beyond inner edges of the work piece perimeter section. Thus, the inner edges of the intermediate border cover a peripheral edge portion of the work piece center section to thereby break the continuity between the image portions on the center section and perimeter section. Preferably, each component of the composite work is rectangularly shaped, and the work piece center section is attached to a back surface of the intermediate border to fill the opening. Also preferably, the inner edges of the perimeter section and the inner edges of the intermediate border are beveled such that the edges lead toward the center section of the work.

A salient aspect of the present invention involves the positioning a spacer between the center section and perimeter section of the work piece to place the sections on different planes. As a result, not only is the continuity in the image broken in the same plane by the mat or intermediate border, but the continuity is broken in different planes to create a perception of depth.

The present invention provides a convenient and efficient way to make an aesthetically pleasing work of art. Only one picture or print need be obtained, and the spacing between the two components of the picture creates a broken yet congruous image which makes a unique impression on the viewer.

The present invention, together with further objects and advantages, will be best understood by reference to the following detailed description taken in conjunction with the accompanying drawings.

DETAILED DESCRIPTION OF THE PREFERRED EMBODIMENT(S)

Figure 1:
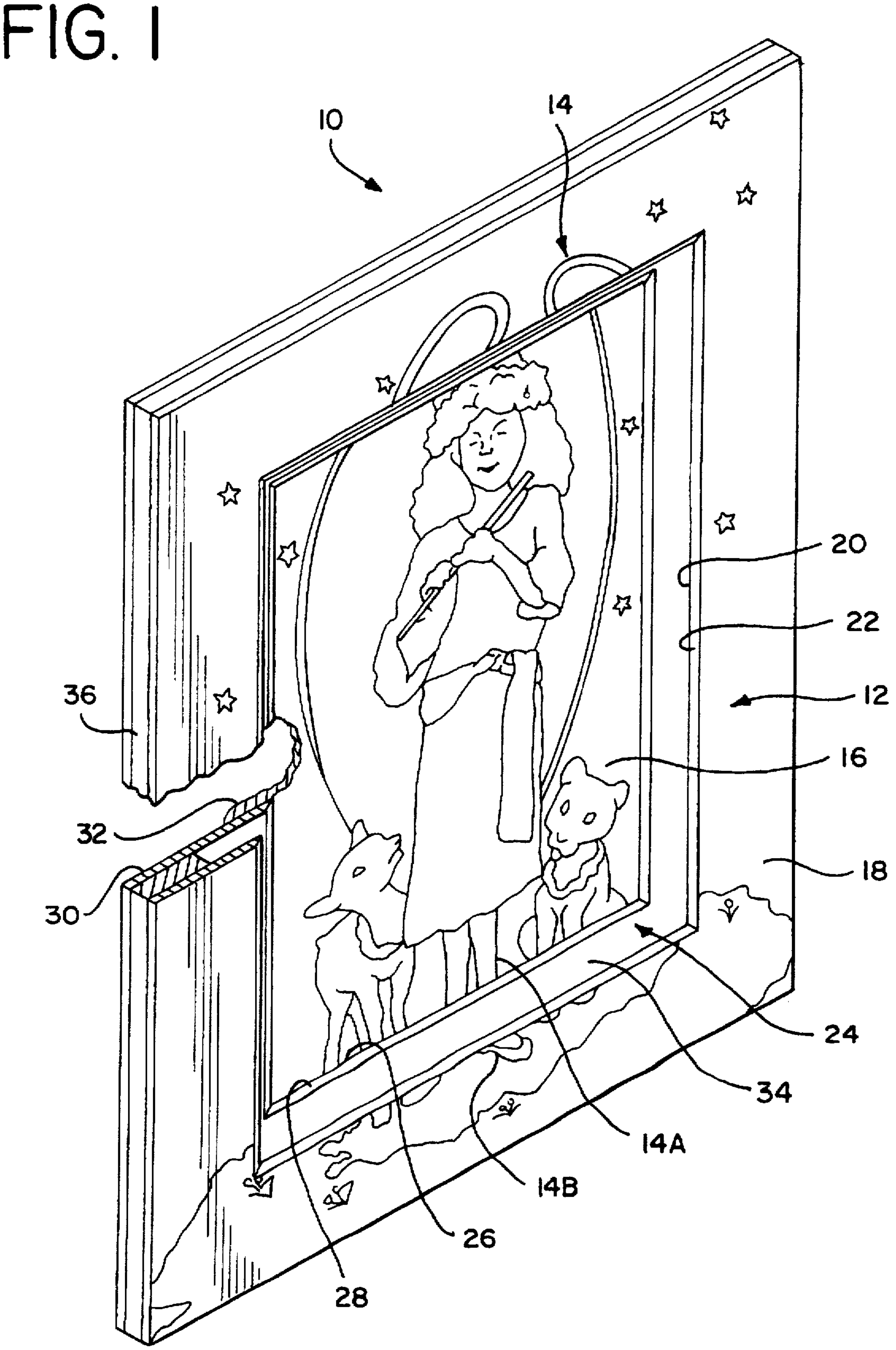
FIG. 1 is a perspective view of the present invention showing a portion of an assembled picture display in cross-section.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 2:
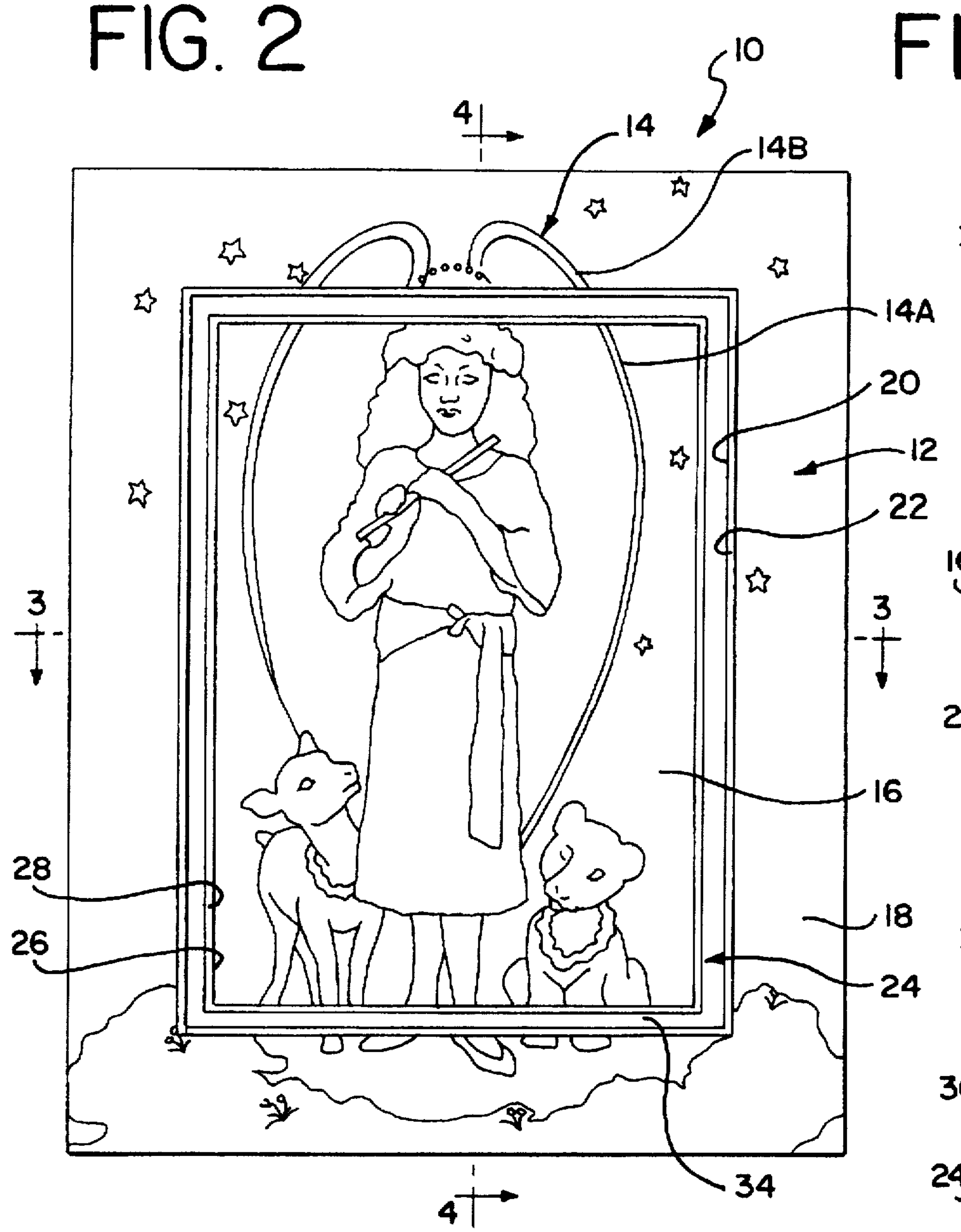
FIG. 2 is an elevational plan view of the assembled picture display.
Figure 3:
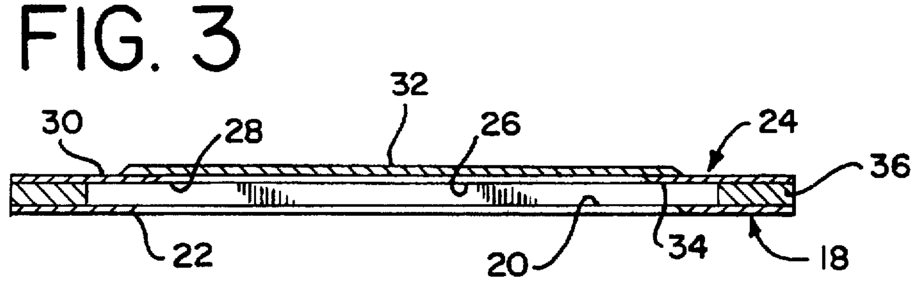
FIG. 3 is a cross-sectional view of the assembled picture display taken along the line 3—3 in FIG. 2.

Referring now to the drawings, wherein like reference numerals refer to like parts throughout the several views, there is shown in FIGS. 1–3 an assembled composite picture display 10. The composite display 10 includes a two-dimensional work 12 such as a print, poster, drawing, painting or photograph defining a split image 14. The work 12 includes a flat, rectangular center section 16 and a flat, rectangular border or perimeter section 18 displaying respective portions 14A, 14B of the image 14. The perimeter section 18 is spaced apart from the center section 16 and has a rectangular central opening 20 defined by inner edges 22.

To create a "mat-like" appearance, a rectangular intermediate border 24 is interposed between the center section 16 and the perimeter section of the work 12. The intermediate border 24 has a central opening 26 defined by inner edges 28. To allow an observer to easily view the intermediate border 24, the central opening 26 is smaller than the central opening 20 in the perimeter section 18 of the work 12. Preferably, the center section 16 of the work 12 is attached to a back side 30 of the intermediate border 24 such that the border 24 conceals a peripheral edge portion 32 of the center section 16 from the view of an observer. Thus, a portion of the image 14 is covered by a mat portion 34 of the intermediate border 24, thereby creating a space between respective portions 14A, 14B of the image 14. Preferably, the intermediate border 24 is configured with a plain dark color on the exposed side thereof. In addition, the inner edges 22, 28 of the perimeter section 18 and intermediate border 24 are preferably beveled such that the edges lead toward the center section 16 of the work 12.

Figure 4:
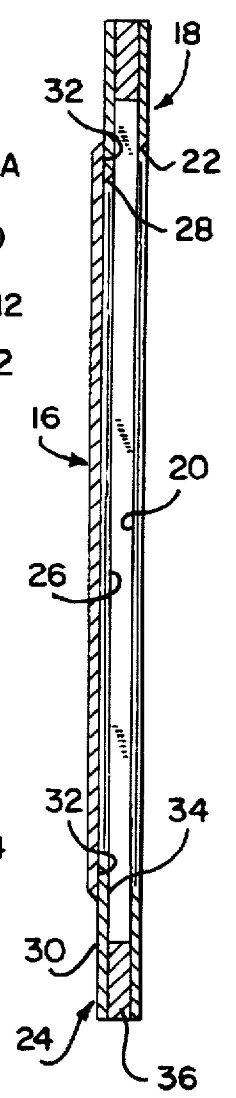
FIG. 4 is a cross-sectional view of the assembled picture display taken along the line 4—4 in FIG. 2.

Another salient feature of present invention is the placement of the perimeter section 18 of the work 12 in generally overlying spaced relation relative to the intermediate border 24. To accomplish this task, and as shown in FIGS. 3 and 4, a rectangular rim structure 36 is positioned between the perimeter section 18 and the intermediate border 24. Thus, a composite work is formed composed of separate image portions 14A, 14B which are spaced apart in two directions to create a broken yet perceptibly congruent image. More specifically, the image portions 14A, 14B of the work 12 are positioned in different layers and the intermediate border 24 is viewed as separating the image portions in a single plane.

While the foregoing composite display 10 is illustrated for purposes of disclosure, it is contemplated that other displays having different constructions and components different in both number, shape and construction may be utilized within the scope of the invention. For example, the image 14 can be any type of image whatsoever, and the components of the display 10 can be any geometric shape instead of rectangular. Preferably, all of the components are made of wood products such as card-board, balsa wood, or the like. Other materials can also be used such as acrylic or other plastics. The components of the display are preferably bound together by a suitable adhesive in a conventional manner. One such method of bonding involves the application of contact adhesive by sprayer, roll or brush to opposing surfaces of adjacent components, and then applying pressure to join the coated surfaces together. It will be appreciated, however, that the components can be joined together in any conventional manner.

Figure 6:
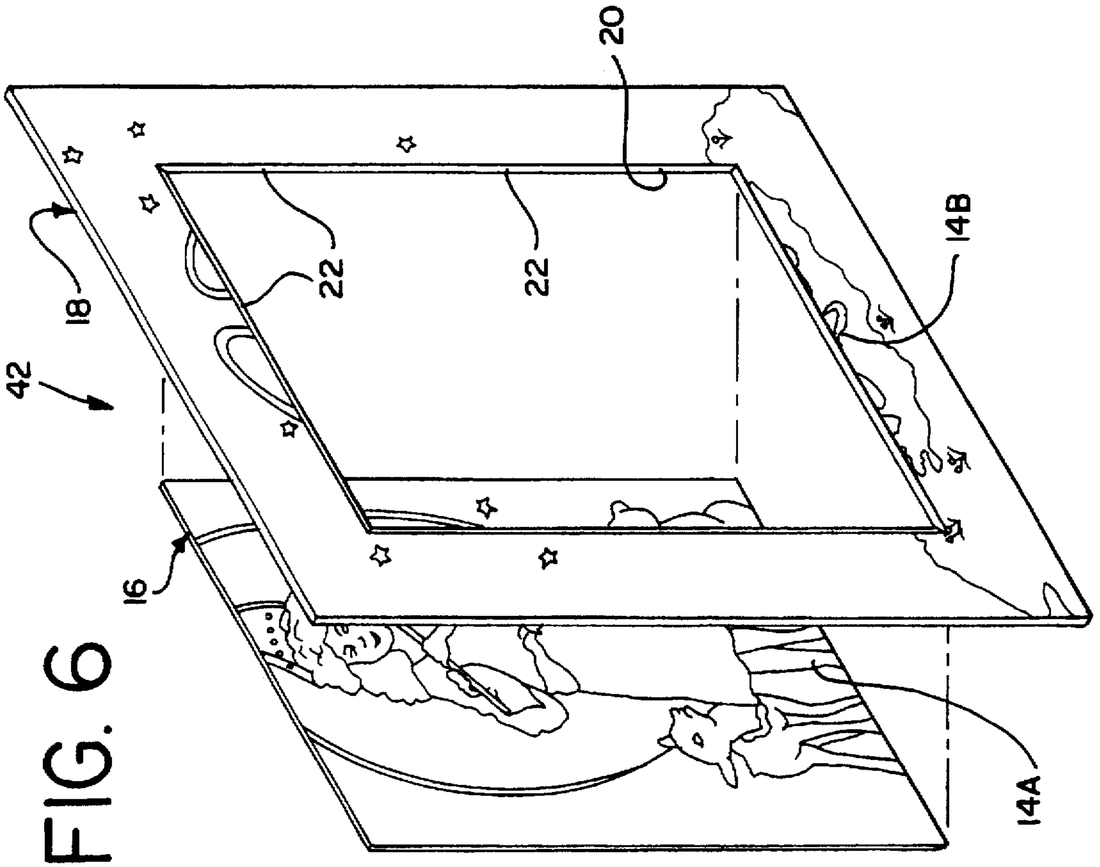
FIG. 6 is a perspective view of the workpiece after a rectangular center section has been cut and separated from a perimeter section.
Figure 5:
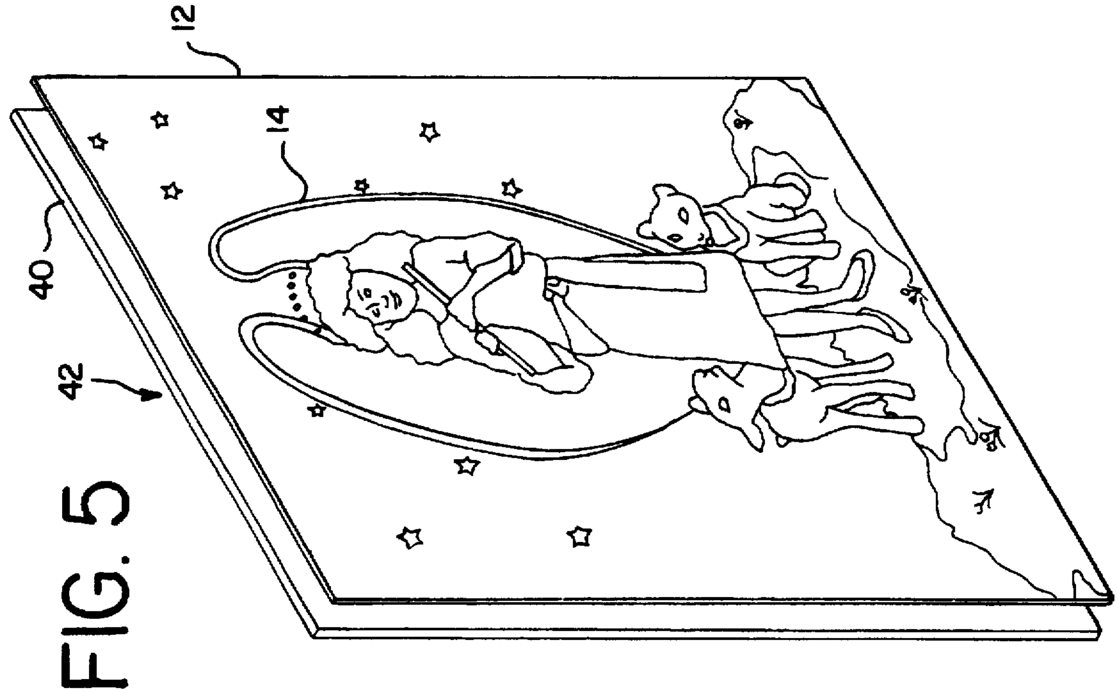
FIG. 5 is a perspective view of a two-dimensional work adjacent a flat backing member prior to being bonded thereto to form a workpiece.

Referring now to FIG. 5, a preferred method or technique for forming the composite work 10 involves obtaining a pre-cut version of the two-dimensional work 12 wherein the image 14 is presented in conventional fashion as a unitary and congruous picture. In a most preferred form of the invention, the work 12 is adhesively bonded to a flat, rectangular backing member 40 to form a work piece 42. The backing member 40 has generally the same shape and surface area as the two-dimensional work 12, which in the illustrated embodiment is rectangular. A clear protective coating such as a plastic laminate, lacquer, finish or other protectant known in the art may also be applied to the work 12 to slow fading and increase the life span of the work. As shown in FIG. 6, a rectangular cut is made in the work piece 42 to define and separate the rectangular center section 16 from the perimeter section 18. As a result, the image 14 of the work 12 is divided so that the center section 16 and perimeter section 18 each displays the respective portion 14A, 14B of the image 14. Preferably, the cut in the work piece 42 is made at an angle to create the beveled inner edge 22 of the perimeter section central opening 20.

Figure 7:
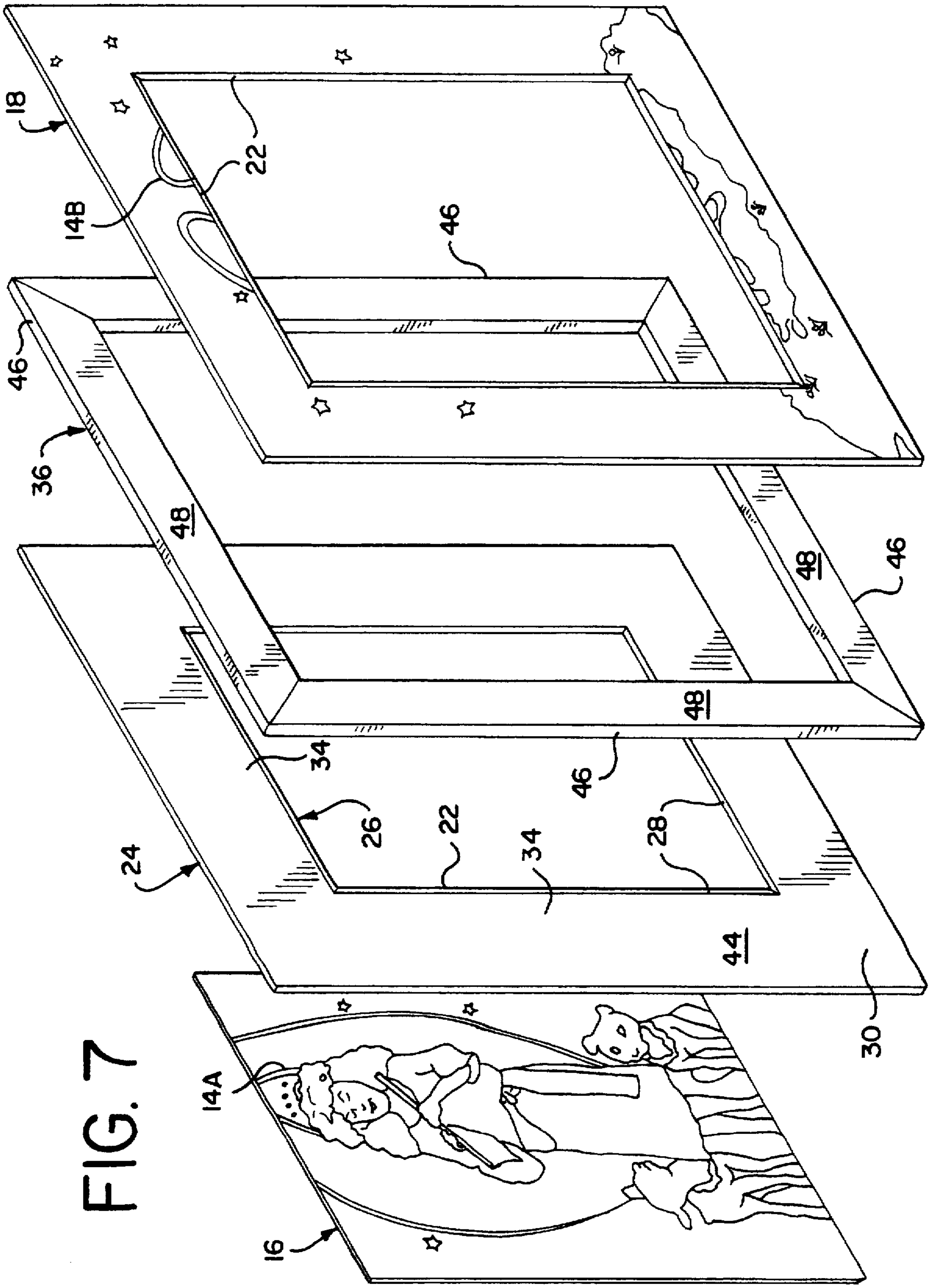
FIG. 7 is an exploded view of the components of the picture display prior to assembly.

Prior to final assembly as illustrated in FIG. 7, a rectangular cut is made in the intermediate border 24 to form the central opening 26 therein. As with the work piece 42, the cut is preferably made at an angle to create the beveled inner edge 22 of the intermediate border central opening 26. The process for cutting the work piece 42 and intermediate border 24 can be any suitable process known in the art, such as using a cutting blade in conjunction with a cutting station. Typical prior art cutting processes and machinery can be complex and time consuming because individual figures or pieces of the image must be cut out of the picture. In contrast, the present invention can utilize the simplest of cutting tools because only rectangular or other simple geometric cuts are required.

Also prior to final assembly, the rectangular rim structure 36 is made using conventional techniques. Preferably, relatively narrow pieces 46 of wood are joined together to form the continuous rectangular rim structure 36. To ensure that the rim structure 36 is concealed from view, the width of the pieces 46 is preferably about half the width of the work piece perimeter section 18. The thickness of the pieces 46 can vary depending on the spacing desired between the central section 16 and perimeter section 18 of the work. Moreover, a plurality of separate spacers or blocks can provide the same function as the rim structure 36.

The components are then assembled together in the orientation shown in FIG. 7 to create the composite work 10, although the various components can be assembled in any temporal order. For example, the work piece center section 16 is adhesively attached to the back surface 30 of the intermediate border 18 to fill the central opening 20 in the intermediate border 18. The rim structure 36 can then be adhesively attached to a front surface 44 of the intermediate border 18. Finally, the work piece perimeter section 18 can be adhesively attached to front surfaces 48 of the rim structure 36. In a most preferred embodiment, the composite work 10 fits within an outer frame (not shown) to create an attractive picture display that can be placed on a piece of furniture or hung on a wall.

Thus, an attractive picture display is provided which includes separate image portions spaced apart in two directions to create a broken yet perceptibly congruent image. That is, the image portions are positioned in different layers and an intermediate border or mat is viewed as separating the image portions in one plane.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A method for producing a composite work, comprising:

providing a single two-dimensional work piece having an image thereon;

cutting said work piece to define a geometrically shaped center section and a separate one-piece perimeter section, wherein said perimeter section extends adjacent and beyond said center section, thereby dividing the image of said two-dimensional work piece into a broken image regardless of individual sculptural components of the work piece and such that each of said center and perimeter sections displays a respective portion of the broken image; and assembling the center section and one-piece perimeter section relative to each other such that said perimeter section surrounds said center section and continuity of the image formed by said sections is broken.

2. A method for producing a composite work, comprising providing a single two-dimensional workpiece having an image thereon;

cutting said work piece to define a geometrically shaped center section and a separate perimeter section, thereby dividing the image of said two-dimensional work piece into a broken image regardless of individual sculptural components of the work piece and such that each section displays a respective portion of the broken image;

positioning an intermediate border between the perimeter section and center section of the work piece, said intermediate border having a central opening defined by inner edges which extend inwardly beyond inner edges of the work piece perimeter section, said inner edges of the intermediate border covering a peripheral edge portion of said work piece center section; and assembling the center section and perimeter section relative to each other such that continuity of the image formed by said center and perimeter sections of said work piece is broken.

3. The method of claim 2 wherein the work piece center section is attached to a back surface of the intermediate border to fill said central opening.

4. The method of claim 3 wherein the inner edges of the perimeter section and the inner edges of the intermediate border are beveled such that said edges lead toward the center section of the work.

5. The method of claim 4 wherein the intermediate border has a front face of a plain color.

6. The method of claim 5 wherein the central and perimeter sections of the work piece and the intermediate border are rectangularly shaped.

7. The method of claim 2 further comprising positioning a spacer between the center section and perimeter section of the work piece to place said sections on different planes and thereby break the continuity between the image portions on said center section and perimeter section.

8. The method of claim 7 wherein said spacer comprises a rectangular rim structure and the work piece perimeter section and intermediate border are attached to opposite sides of said rim structure.

9. The method of claim 2 further comprising positioning a spacer between the intermediate border and the perimeter section of the work piece to place the center section and perimeter section of the work piece on different planes and thereby place the image portions on said center section and perimeter section of the work piece in spaced relation in two directions.

10. The method of claim 2 wherein the work piece is formed by bonding a flat two-dimensional work to a flat backing member having generally the same shape and size as said two-dimensional work.

11. A method for producing a composite work, comprising:

providing a flat, rectangular work having an image thereon;

providing a substantially rigid, flat, rectangular backing member having generally the same surface area as said work;

bonding said work to said backing member to form a work piece;

cutting said work piece to define a center section and a separate perimeter section having a central opening defined by inner edges, thereby breaking the image of said work such that each of said sections displays a portion of the image;

providing a substantially rigid, flat, rectangular, intermediate border having a central opening defined by inner edges, the central opening in the intermediate border being smaller than the central opening in said work piece perimeter section;

attaching the work piece center section to a back surface of the intermediate border to fill said central opening in the intermediate border, said intermediate border covering a peripheral edge portion of said work piece center section;

providing a rectangular rim structure;

positioning the work piece perimeter section in generally overlying spaced relation relative to the intermediate border by attaching said work piece perimeter section and intermediate border to opposite sides of the rim structure, wherein said inner edges of the intermediate border extend inwardly beyond the inner edges of the work piece perimeter section to allow a viewer to see said intermediate border which covers said peripheral edge portion of said work piece center section;

thereby forming a composite work composed of separate image portions spaced apart in two directions to create a broken yet perceptibly congruent image, said image portions being positioned in different layers and said intermediate border being viewed as separating the image portions in one plane.

12. The method of claim 11 wherein the inner edges of the perimeter section and the inner edges of the intermediate border are beveled such that said edges lead toward the center section of the work.

13. The method of claim 11 wherein the intermediate border has a front face of a plain color.

14. The method of claim 11 wherein said bonding is provided by application of contact adhesive between said work and backing member.

15. The method of claim 11 further comprising applying a protective coating to said work piece.

* * * * *